(12) United States Patent
Star-Lack et al.

(10) Patent No.: US 8,897,527 B2
(45) Date of Patent: Nov. 25, 2014

(54) MOTION-BLURRED IMAGING ENHANCEMENT METHOD AND SYSTEM

(75) Inventors: Josh Star-Lack, Palo Alto, CA (US); Mingshan Sun, Menlo Park, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 460 days.

(21) Appl. No.: 13/154,465

(22) Filed: Jun. 7, 2011

(65) Prior Publication Data

US 2012/0314921 A1 Dec. 13, 2012

(51) Int. Cl.
G06K 9/00 (2006.01)
G06K 9/52 (2006.01)
G06T 11/00 (2006.01)

(52) U.S. Cl.
CPC ......... G06T 11/005 (2013.01); *G06T 2211/412* (2013.01)
USPC ............................ 382/131; 382/174; 382/206

(58) Field of Classification Search
CPC .................. G06T 2207/10081; G06T 11/003; G06T 2211/421; G06T 5/002; G06T 5/003; G06T 2210/41; G06T 7/20; A61B 6/032; G01N 23/046
USPC .................. 382/128, 131, 174, 206
See application file for complete search history.

(56) References Cited

U.S. PATENT DOCUMENTS

| | | | |
|---|---|---|---|
| 6,539,074 B1 * | 3/2003 | Yavuz et al. ..................... | 378/4 |
| 2004/0234115 A1 | 11/2004 | Zijp et al. | |
| 2006/0133564 A1 | 6/2006 | Langan et al. | |
| 2006/0245536 A1 | 11/2006 | Boing et al. | |
| 2006/0262895 A1 | 11/2006 | Kawachi et al. | |
| 2007/0167707 A1 * | 7/2007 | Mistretta et al. ............... | 382/131 |
| 2008/0219535 A1 * | 9/2008 | Mistretta et al. ............... | 382/131 |
| 2010/0021033 A1 | 1/2010 | Bruder et al. | |
| 2010/0195931 A1 | 8/2010 | Teshigawara et al. | |
| 2011/0044559 A1 | 2/2011 | Erhard et al. | |
| 2011/0081068 A1 | 4/2011 | Brinks et al. | |
| 2012/0275657 A1 * | 11/2012 | Kolthammer et al. ........ | 382/107 |
| 2012/0275673 A1 | 11/2012 | Star-Lack et al. | |
| 2013/0028495 A1 | 1/2013 | Star-Lack et al. | |

FOREIGN PATENT DOCUMENTS

WO 2009136347 A1 11/2009

OTHER PUBLICATIONS

Notification of Transmittal of the International Search Report and the Written Opinion of the International Searching Authority, Oct. 22, 2012.
Shuai Leng et al., "Streaking artifacts reduction in four-dimensional cone-beam computed tomography," Med. Phys., Oct. 2008, 4649-4659, vol. 35, No. 10, Am. Assoc. Phys. Med.

(Continued)

*Primary Examiner* — Amir Alavi
*Assistant Examiner* — Kenny Cese
(74) *Attorney, Agent, or Firm* — SU IP Consulting

(57) ABSTRACT

In accordance with at least some embodiments of the present disclosure, a process for enhancing a motion-blurred image is presented. The process may include receiving a plurality of projections, wherein the plurality of projections contain computed tomography (CT) data obtained in multiple motion phases. The process may include generating an enhanced multi-phase image by performing an enhancement operation based on the plurality of projections. The process may further include generating a plurality of phase-correlated images based on the plurality of projections and the enhanced multi-phase image.

22 Claims, 7 Drawing Sheets

(56) References Cited

OTHER PUBLICATIONS

Graeme C. Mc Kinnon et al., "Towards Imaging the Beating Heart Usefully with a Conventional CT Scanner," IEEE Transactions on Biomedical Engineering, Feb. 1981, 123-127, vol. BME-28.

Kathryn L. Garden et al., "3-D Reconstruction of the Heart from few Projections: A Practical Implementation of the McKinnon-Bates Algorithm," IEEE Transactions on Medical Imaging, Dec. 1986, 233-239, vol. MI-5, No. 4.

Ziyi Zheng et al., "Fast 4D Cone-Beam Reconstruction Using the McKinnon-Bates Algorithm with Truncation Correction and Non Linear Filtering," Proc. SPIE 7961, 79612U, Mar. 2011.

S Mazin et al., "Metal Artifact Reduction Algorithm for X-Ray CT Using a Three-Pass Approach", Medical Physics, Jun. 2009, p. 2432 (See Su-EE-A4-03), vol. 36, No. 6.

Adrian N. Evans et al., "Biased Motion-Adaptive Temporal Filtering for Speckle Reduction in Echocardiography", IEEE Transactions on Medical, Imaging, Feb. 1996, pp. 39-50, vol. 15, No. 1.

\* cited by examiner

MOTION-BLURRED IMAGING ENHANCEMENT METHOD AND SYSTEM

BACKGROUND OF THE DISCLOSURE

1. Field of the Disclosure

Embodiments of the present disclosure relate generally to image processing technologies and more specifically to motion-blurred imaging enhancement methods and systems.

2. Description of the Related Art

Unless otherwise indicated herein, the approaches described in this section are not prior art to the claims in this application and are not admitted to be prior art by inclusion in this section.

Computed tomography (CT) has been a widely used imaging technique. However, when a CT medical imaging device takes an insufficient number of samples, aliasing artifacts such as streaks may appear in the reconstructed images. Cone-beam computed tomography (CBCT), which involves the use of wide area detectors, is more susceptible to undersampling problems because data frame rates are slower.

One challenge for medical cone-beam computed tomography is to manage respiratory motion. Due to the relatively slow gantry rotation times, it is very difficult to acquire a full CBCT data set in a single breath hold, much less in a single respiratory phase (e.g., inspiration or expiration). However, because motion is periodic, a 4-D image (3 spatial dimensions and 1 time dimension) can be obtained by grouping the acquired CBCT projections by respiratory phase and reconstructing a distinct 3-D image for each phase. In many cases, due to the sparse or "wagon-wheel" projection sampling distributions associated with each respiratory phase, aliasing artifacts, including streaks emanating from bones, are often introduced. While it is possible to reduce these artifacts by slowing down the gantry rotation rate thus reducing the distance between adjacent wagon-wheel spokes, there are substantial costs associated with lengthening the imaging times and delivering higher doses of radioactive X-rays.

DETAILED DESCRIPTION

Figure 1:
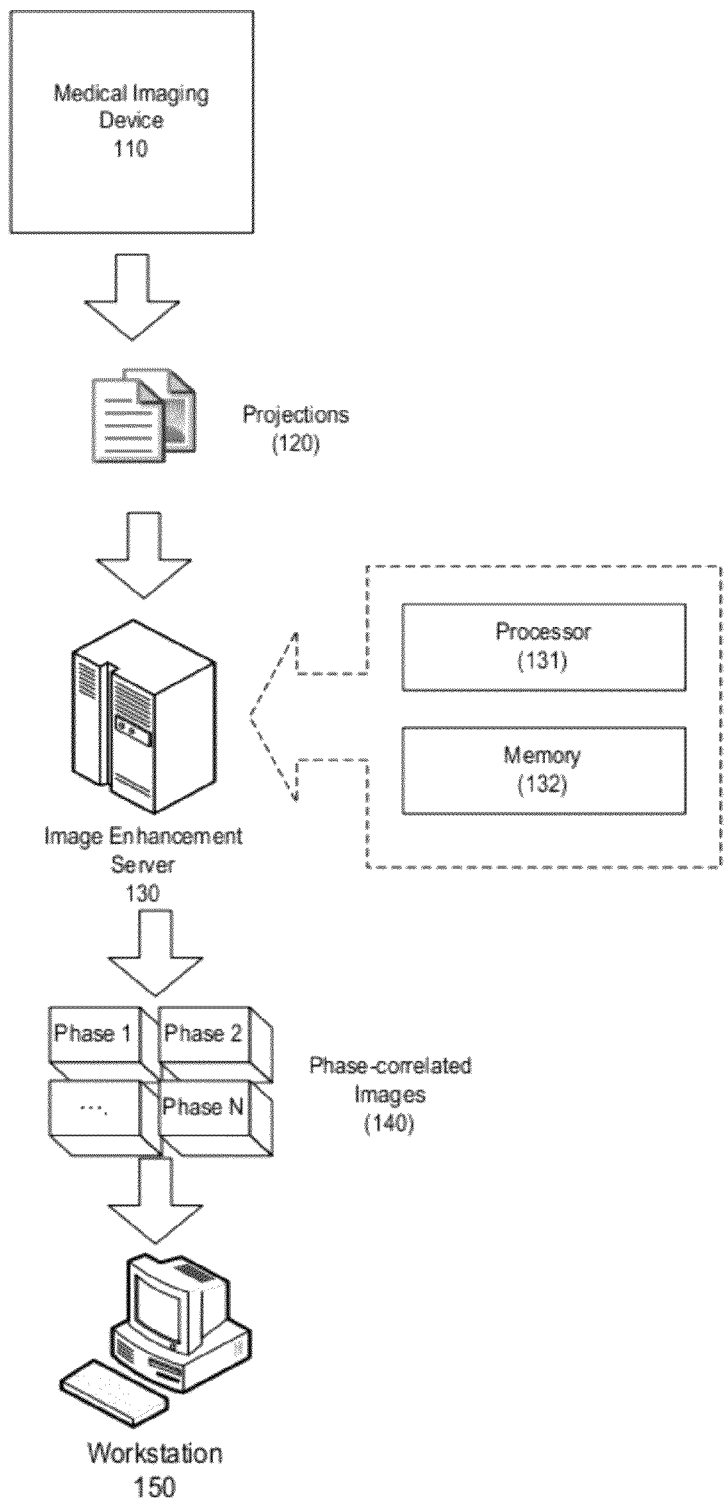
FIG. 1 shows a block diagram illustrating one embodiment of a system configured to enhance a motion-blurred image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Throughout the disclosure, the terms "image" and "reconstructed image" are used interchangeably to broadly refer to a set of data that graphically represents a physical object or a person. For example, a 3D image of a patient's heart may be reconstructed based on a set of 2D x-ray projections taken through the heart and its surrounding anatomy by a medical imaging device. Similarly, by processing a set of sinograms associated with a section of a patient's body, a cross-section image of the patient's body may be generated. A "smoothing" operation (also may be referred to as a softening operation), may include, without limitation, an operation to replace one pixel value with another, an operation to increase or decrease a pixel value, or other similar operations.

Throughout the disclosure, the term "multi-phase" may broadly refer to multiple motion phases (e.g., respiratory phases such as inspiration and expiration, cardiovascular phases such as diastole and systole, muscular phases such as concentric contraction and eccentric contraction, and others). The term "phase-correlated" may broadly characterize data that are organized based on the multiple motion phases. For example, a set of phase-correlated images may be sorted based on the number of respiratory phases and/or the sequence in which the respiratory phases occur. Alternatively, the phase-correlated images may be sorted based on the types of respiratory phases. That is, one of the phase-correlated images may be associated with all the inspiration phases, while another one of the phase-correlated images being associated with all the expiration phases.

FIG. 1 shows a block diagram illustrating one embodiment of a system configured to enhance a motion-blurred image. In particular, one or more medical imaging devices 110 may generate projections 120, which an image enhancement server 130 may process and generate a set of phase-correlated images 140. The phase-correlated images 140 may then be transmitted to one or more workstations 150 for displaying and further processing.

Some examples of the medical imaging device 110 may include, without limitation, an X-ray device, CT device, Magnetic Resonance Imaging device, and others. An example image enhancement server 130 may include one or more processors 131, memory 132, and/or other components, so that it could process the projections 120. Similarly, an example workstation 150 may also include one or more processors, memory, and/or other components (not shown), so that it could process the phase-correlated images 140. It should be apparent to a person having ordinary skills in the art to recognize that the image enhancement server 130 and the work station 150 may correspond to the same computing device. It may also be possible that some or all of the functionalities supported by the image enhancement server 130 and the workstation 150 are implemented as a part of the medical imaging device 110.

In some embodiments, the processor(s) 131 of the image enhancement server 130 may include central processing units (CPUs) for controlling the overall operation of the image enhancement server 130. The processor(s) 131 may accomplish this by executing software or firmware stored in memory 132. The processor(s) 131 may be or may include, one or more programmable general-purpose or special-purpose microprocessors, digital signal processors (DSPs), programmable controllers, application specific integrated circuits (ASICs), programmable logic devices (PLDs), graphical processing units (GPUs) or the like, or a combination of such devices. The memory 132 may represent any form of random access memory (RAM), read-only memory (ROM), flash memory (as discussed above), or the like, or a combination of such devices. In use, the memory 132 may contain, among other things, a set of machine readable instructions which, when executed by the processor 131, causing the processor 131 to perform at least some embodiments of the present disclosure.

In some embodiments, the workstation 150 may be a computer device with sufficient resources (e.g., graphics cards, memory, hard-drive, fast network connectivity, and others) to perform multi-dimensional image rendering and display the rendered phase-correlated images 140. The workstation 150 may also be installed with visualization software and tools for advanced editing and processing of the phase-correlated images 140. The details of the projections 120, the image enhancement server 130, and the phase-correlated images 140 are further described below.

Figure 2:
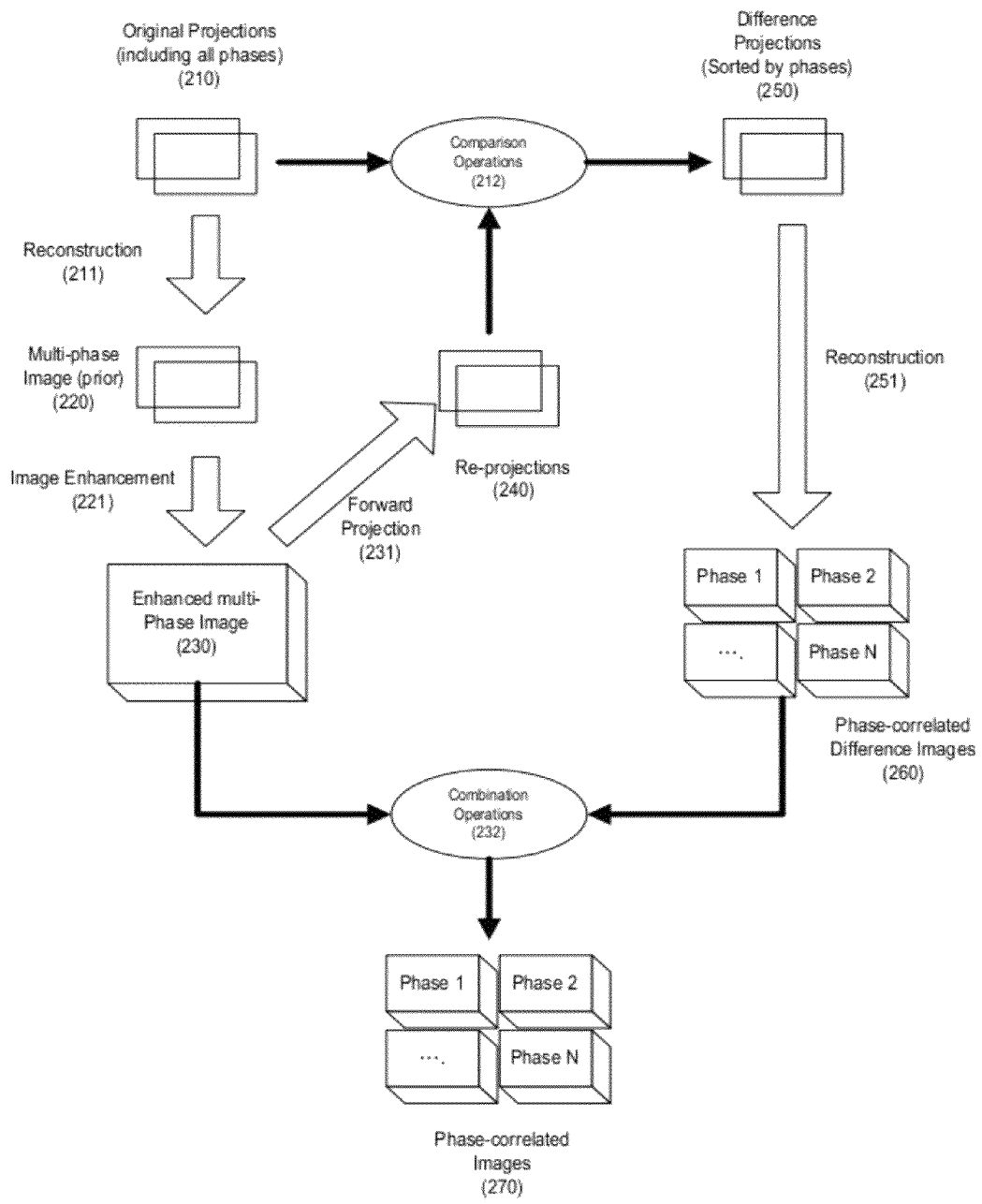
FIG. 2 shows a flow diagram illustrating one embodiment of a process for generating one or more phase-correlated images.

FIG. 2 shows a flow diagram illustrating one embodiment of a process for generating one or more phase-correlated images. Specifically, a set of original projections 210, which are obtained from a medical imaging device such as the medical imaging device 110 of FIG. 1 in multiple motion phases (e.g., multiple respiratory, cardiovascular, or muscular phases,) may be processed by an image enhancement server such as the image enhancement server 130 of FIG. 1.

In some embodiments, a reconstruction operation 211 employing a filtered-backprojection algorithm, such as the Feldkamp, Davis, and Kress (FDK) algorithm, may be utilized to generate a multi-phase image 220 from the original projections 210. When the multi-phase image 220, which may also be referred to as a "prior" image, is generated from a sufficient number of the original projections 210, this prior image may include the blurred boundaries of moving organs, such as a heart or a lung, and a time-averaged signal for the moving tissues. On the other hand, when there is an insufficient number of the original projections 210, or when there are inconsistencies in the original projections 210, various artifacts, such as motion-induced streaks, may be present in the reconstructed multi-phase image 220.

In some embodiments, an image enhancement operation 221 may be utilized to process the multi-phase image 220 to generate an enhanced multi-phase image 230. The image enhancement operation 221 may reduce or remove the artifacts from the multi-phase image 220. By using the enhanced multi-phase image 230, instead of the multi-phase image 220, the rest of the illustrated reconstruction and processing operations in FIG. 2 may yield substantially improved results.

One example image enhancement operation 221 may use a motion extraction approach to estimate the positions and intensities of the streaks in the prior image 220 and subtract these streaks from the prior image 220. Another example image enhancement operation 221 may utilize a filtering approach. When streaks may be viewed as correlated noise superimposed on the prior image 220, image restoration techniques, such as linear or nonlinear filtering, may be applied to reduce the streaks' intensities. Yet another example image enhancement operation 221 may adapt a segmentation approach, in which a segmentation mechanism may separate the prior image 220 into multiple segments by structure, and the streaking artifacts may then be removed from the prior image 220. The details of the aforementioned example image enhancement operations are further described below.

In some embodiments, the enhanced multi-phase image 230 may be forward-projected (231) to generate a set of re-projections 240. The re-projections 240 may be generated using the same configurations that are utilized by the medical imaging device for generating the original projections 210. For example, the image enhancement server may simulate the similar scanning angles and geometry and exposure periods of the medical imaging device, and perform estimated scanning operations on the enhanced multi-phase image 230 to generate the re-projections 240. In other words, similar forward-projection operations may be utilized to generate both the original projections 210 and the re-projections 240, except that the original projections 210 are based on a physical object (e.g., a patient's body), and the re-projections 240 are based on a virtual object in the enhanced multi-phase image 230.

In some embodiments, the re-projections 240 and the original projections 210 may have the same number of projection frames and contain the same number of motion phases. Further, each of the re-projections 240 may correspond to each of the original projections 210 and thus may be meaningfully compared with one another. Since the multi-phase image 230 may be motion-blurred, the re-projections 240 may also be deemed "blurred projections" relative to the original projections 210.

In some embodiments, the original projections 210 and the re-projections 240 may be processed by one or more comparison operations 212 to generate a set of difference projections 250. For example, each original projection 210 and its corresponding re-projection 240 may be compared for differences. The resulting difference projection 250 may show no difference in some areas, indicating lack of motion in these areas during the acquisition of the original projections 210. Areas in the difference projection 250 that show significant differences, on the other hand, indicate locations of motion during the collection of the original projections 210.

In some embodiments, the difference projections 250 may then be sorted by motion phases, and a reconstruction operation 251 may be performed to generate a set of phase-correlated difference images 260 from the difference projections 250. The difference projections 250 that belong to a certain inspiration or expiration phase may be used in the reconstruction operation 251, which may be similar to the reconstruction operation 211, to reconstruct a difference image 260. For example, assuming there are 600 original projections 210 collected during 5 inspiration phases and 5 expiration phases. The forward-projection operation 231 may generate 600 re-projections 240 corresponding to the 600 original projections 210. Subsequently, the comparison operations 212 may result in 600 difference projections 250, which may be sorted in the order of the 5 inspiration and 5 expiration phases. The sorted difference projections 250 may then be relied upon to reconstruct 10 phase-correlated difference images 260.

In some embodiments, each of the phase-correlated difference images 260 may be used to illustrate motion that may exist during a particular motion phase. For the regions that have motion, each of the phase-correlated difference images 260 may include non-zero pixel values, indicating dissimilarities from the enhanced multi-phase image 230. The image enhancement server may perform one or more combination operations 232 between the enhanced multi-phase image 230 and the phase-correlated difference images 260 to generate a set of phase-correlated images 270. As an example, each of the phase-correlated difference images 260 may be added to or subtracted from the enhanced multi-phase image 230 to generate each of the phase-correlated images 270. These phase-correlated images 270 may have reduced or removed viewing aliasing artifacts such as streaks, since in areas where there is no motion, the phase-correlated images 270 may show less difference from the higher quality prior images 220 that are generally devoid of view aliasing artifacts. In areas where motion is present, the phase-correlated images 270 may include fewer artifacts and better represent true motion compared to the ones that are generated without the image enhancement operation 221. Note that the phase-correlated difference images 260 may themselves be enhanced before combination with the enhanced multi-phase image 230.

Figure 3:
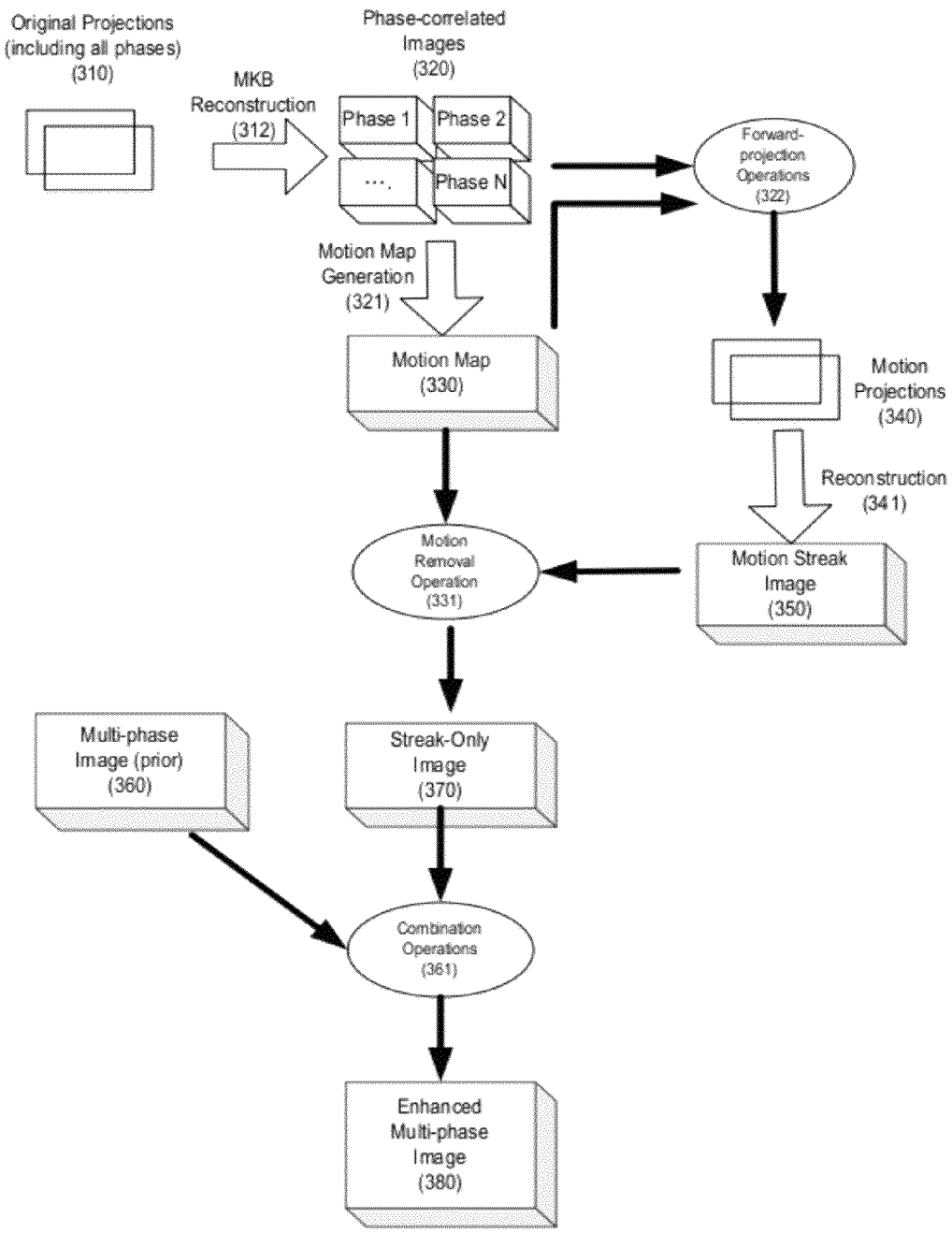
FIG. 3 shows a flow diagram illustrating one embodiment of a process for extracting motion information to enhance a multi-phase image.

FIG. 3 shows a flow diagram illustrating one embodiment of a process for extracting motion information to enhance a multi-phase image. As described above, motion extraction may be one of the approaches in generating an enhanced multi-phase image such as the enhanced multi-phase image 230 of FIG. 2. In FIG. 3, a set of original projections 310 may be similar to the original projections 210 of FIG. 2. A multi-phase image 360 (also referred to as a prior image 360) may be similar to the multi-phase image 220 of FIG. 2, and an enhanced multi-phase image 380 may be similar to the enhanced multi-phase image 230 of FIG. 2. Thus, the example process illustrated in FIG. 3 may provide additional details to the image enhancement operation 221 of FIG. 2.

In some embodiments, the original projections 310 may be used to generate the prior image 360, which may contain motion-induced artifacts such as streaks. To generate an approximately streak-free prior image 360, one approach may involve identifying and forward-projecting parts of the prior image 360 having motion (e.g., identifying moving pixels) to generate motion projections. The motion projections may be reconstructed to create a streak image, which mainly contains moving objects and motion-induced streaks. Then this streak image may be subtracted from the prior image 360.

To illustrate, a first-pass McKinnon Bates (MKB) reconstruction operation 312 is performed to generate a set of phase-correlated images 320 (also referred to as MKB phase-correlated images). The phase-correlated images 320 may correspond to the phase-correlated images 270 of FIG. 2. However, unlike the process shown in FIG. 2, the MKB reconstruction operation 312 does not include the image enhancement operation 221.

The phase-correlated images 320 may contain multiple images (denoted $g_i$, i=1 . . . N; with i being the number of phases) that are sorted based on the different motion phases. Using the same example discussed above, suppose the original projections 310 contains 600 projections that correspond to 5 inspiration phases and 5 expiration phases. Thus, the phase-correlated images 320 may include 10 images ($g_1$ to $g_{10}$). The image 320 that belongs to a single phase i may correspond to projections generated from multiple angles (denoted $a_{ij}$, j=1 . . . M, with j being the number of projections in i phase). Suppose further that a phase-correlated image may be generated based on 60 original projections 310 ($a_{i1}$, $a_{i2}$, $a_{i3}$, . . . , $a_{i60}$) that are collected within a single i respiratory phase.

In some embodiments, the phase-correlated images 320 may be used to generate a motion map 330 (denoted h) via a motion map generation operation 321. The motion map generation operation 321 may evaluate each corresponding pixel in the phase-correlated images 320 and determine the temporal standard deviations associated with these pixels. Based on the pixel value distribution, the motion map generation operation 321 may scale the deviation and assign the scaled temporal standard deviation value for the motion map 330. For example, for a specific pixel position, the motion generation operation 321 may collect the pixel values from the 10 phase-correlated images 320 and calculate the standard deviations of these 10 values. The standard deviations may then be scaled to a value between 0 and 1, with 0 denoting to no motion detected, and 1 representing maximum motion detected. The scaled value may then be saved at the specific pixel position in the motion map 330. Alternatively, the motion map 330 may be generated by examining the behavior of each pixel in the frequency domain.

In some embodiments, for each phase, the motion map 330 (h) and a specific image 320 ($g_i$) for that particular respiratory phase i may be used in one or more forward-projection operations 322 to generate a motion projection 340 for the phase. In particular, the forward-projection operation 322 may first multiply the motion map 330 with the specific image 320 then forward-project the outcome at all the angles ($a_{ij}$) to create the motion projections 340. After all the phase-correlated images 320 are processed, the outcome may be a set of motion projections 340, which may then be used in a reconstruction operation 341 to reconstruct a motion-streak image 350. The reconstructed motion-streak image 350 may be deemed a new static image (denoted $f_1$), which contains both the moving objects and the motion-induced streaks.

In some embodiments, the moving objects in the motion-streak image 350 may be removed via a motion removal operation 331, resulting in a streak-only image 370 (denoted $f_2$). Specifically, the motion removal operation 331 may multiply the motion-streak image 350 with the inverse of the motion map 330, in a pixel by pixel fashion, using the formula: $f_2=f_1\times(1-h)$. Since the motion map 330 may contain information associated with the moving objects, such an operation may remove the moving objects but leave the streaks in the resulting streak-only image 370.

In some embodiments, the streak-only image 370 and the multi-phase image 360 may undergo one or more combination operations 361 to generate the enhanced multi-phase image 380. One example combination operation 361 may involve subtracting the streak-only image 370 from the prior image 360 to generate the enhanced multi-phase image 380 (which may also be referred to as a destreaked prior image). In some embodiments, the streak-only image 370 may be scaled by matching streak intensities in air regions. Further, if some fine streaks still remain, which could be due to imperfections in the motion map 330, a second streak estimation pass based on the enhanced multi-phase image 380 may be conducted.

In addition to the motion extraction approach discussed above to enhance a multi-phase image, another approach is to filter the multi-phase image. For example, linear filters such as, without limitation, Gaussian filters, and nonlinear filters with edge-preserving properties, such as, without limitation, a median filter, a bilateral filter, a neighbourhood filter (NF), and/or non-local means filter (NLM), may be used to effectively destreak the prior image 360 by reducing the streak intensities in the prior image 360. The edge-preserving properties may prevent some of the edges and boundaries of the organs and bones to be treated as streaks. In addition, iterative reconstruction techniques with total variation/compressed sensing and penalized weighted least square regulations may be employed, along with the nonlinear filters, to create the prior image 360.

Figure 4:
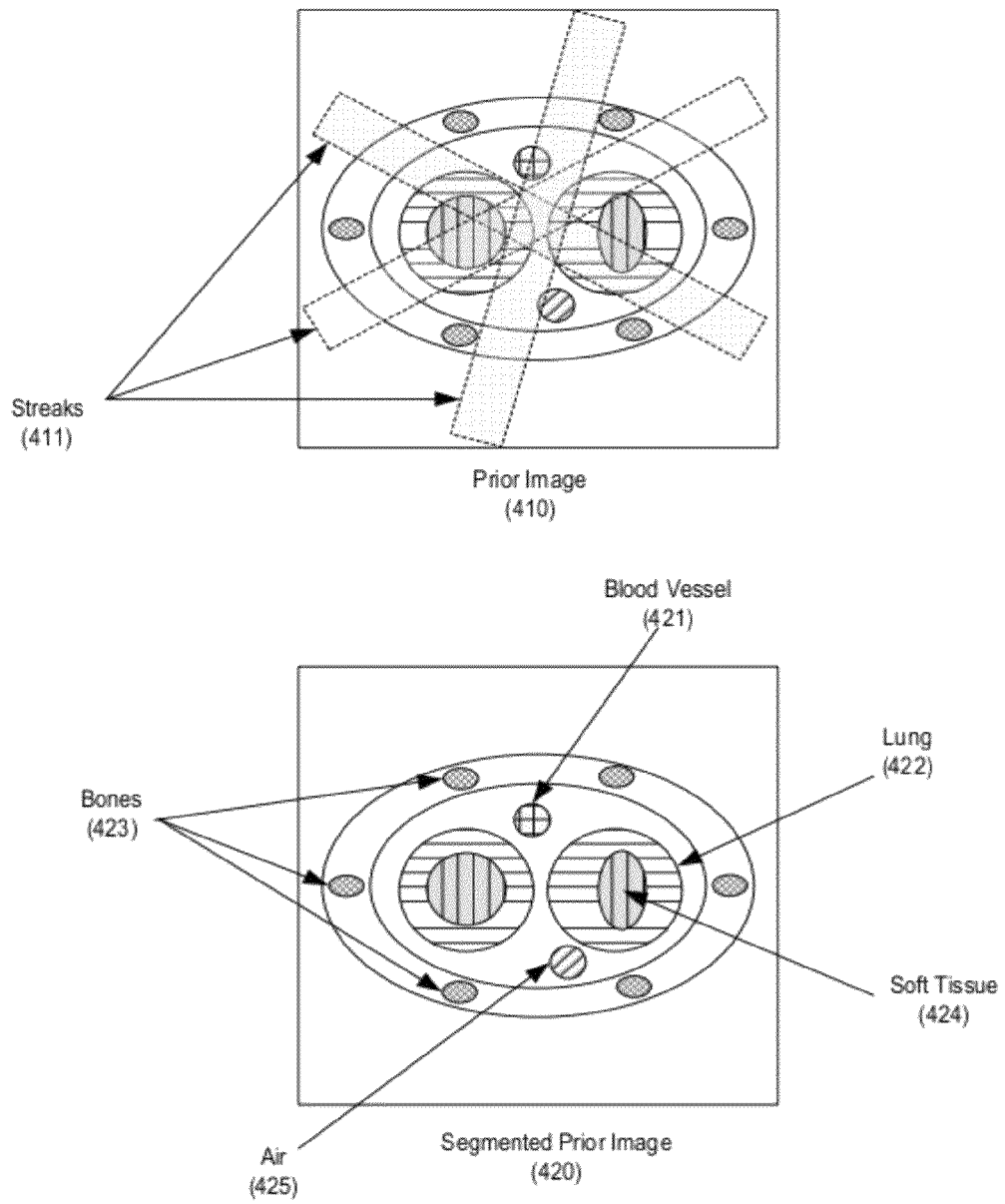
FIG. 4 shows example multi-phase images illustrative one embodiment of a segmentation approach.

FIG. 4 shows example multi-phase images illustrative of one embodiment of a segmentation approach. Specifically, a multi-phase image or a prior image 410 with a cross-section view of a patient's chest is shown. The prior image 410 may contain one or more streaks 411 that are introduced during the scanning and reconstruction of the patient's chest by a medical imaging device. One assumption may be made that within the prior image 410, the intensities of the pixel values for a specific anatomical structure are similar, and any non-uniformity may be caused by artifacts such as the motion-induced streaks 411. Therefore, to reduce or remove the motion-induced streaks 411, the prior image 410 may be segmented into different anatomical structures, such as, without limitation, lung, soft tissue, vessels, and bone. Within each anatomical structure, aggressive smoothing may be performed. Alternatively, the pixel values for a given anatomical structure may be replaced with a constant or a different value. By changing the values of the pixels in the prior image 410, the streaks 411 may be significantly reduced or removed.

In some embodiments, a gray-level threshold-based segmentation may be used to segment the prior image 410 into multiple anatomical structure segments. Since motion-induced streaks may cause large Hounsfield Unit (HU) variations across a uniform region, the threshold boundaries may range over hundreds of HUs. During segmentation, the prior image 410 may be first transformed into a segmented multi-phase image or a segmented prior image 420. In the segmented prior image 420, different regions may represent different organ structures, body parts, cavities (or air regions), such as, without limitation, blood vessel 421, lung 422, bones 423, soft tissue 424, air region 425.

In some embodiments, a threshold range based on the intensity of the pixel values may be determined for each of the organ structures or body parts. The threshold range may be selected based on a middle point between the separation of two different body parts (e.g., soft tissue and bone). The selection of the threshold range may be aided with a histogram of the prior image 410, showing the range variations throughout the prior image 410. The threshold range may also be adjusted to account for intensity variations caused by the motion-induced streaks 411. Thus, a set of threshold ranges may be determined for all the body parts and air. Afterward, each pixel in the prior image 410 may be classified as belonging to one of the threshold ranges.

After having classified the pixels, a region in the segmented prior image 420 may be identified as a segment and filled with constant values or values associated with the specific body part or air. Also, a mean value that is calculated based on the prior image 410 may be used as the filling value for the specific segment. After having replaced all pixel values for the segment with new values, the streaks 411 may be effectively reduced or removed from the prior image 410, provided that the streak intensities are smaller than the CT number separation between the threshold ranges. In certain cases, motion streaks can have intensities up to +/−200 HU. To separate one segment from another in the presence of these streaks, the difference between the mean HU values of the two segments should exceed the intensities of these streaks. For example, air, lung tissue, soft tissue and bones have typical HU values −1000 HU, −700 HU, 0 HU, and 800+ HU respectively. An exemplary set of thresholds can then be set at −800 HU, −500 HU, and 400 HU, to separate air from lung, lung from soft tissue, and soft tissue from bones. In some embodiments, additional operations may be required to ensure that there is a gradual transition from one segment to an adjacent one. Otherwise, as a result of the forward projection operation 231 in FIG. 1, noise may be introduced into the difference projections during the comparison operation, which may in turn create new streaks in the final images.

In some embodiments, an example segmentation approach may include a boundary smoothing operation, which utilizes low pass filters (e.g., two or three-dimensional linear filters) to reduce any abrupt jumps between adjacent threshold regions. However, such filters may soften the true organ boundaries, which may be undesirable since the forward-projected boundaries may not match the real organ boundaries and thus may also introduce new streaks into the difference images. To reduce such effects, the cut-off frequency of the low pass filters may be appropriately chosen, for example, at approximately 0.25 or 0.5 of the image Nyquist frequency.

In addition, boney anatomy (or other body parts) that is generally stationary or nearly stationary during the scan may have high contrast in the projections. Since mismatches between the original projections and the forward-projections from the prior image may reduce the final image quality, another consideration for the boundary smoothing operation may include not smoothing the stationary or nearly stationary body parts.

Because the resultant segments may not reflect true object boundaries, an example segmentation approach may include a border erosion operation to demark a transition zone between the segments to counter possible inconsistencies between the re-projections and the original projections. In these narrow boundary zones, the original prior image pixel values may be used to replace the values after segmentation. Such an operation may preserve the high frequency information in the original prior image pixels. The details of the aforementioned boundary smoothing operation and boundary erosion operation are further described below and mainly in conjunction with FIG. 7.

Figure 5:
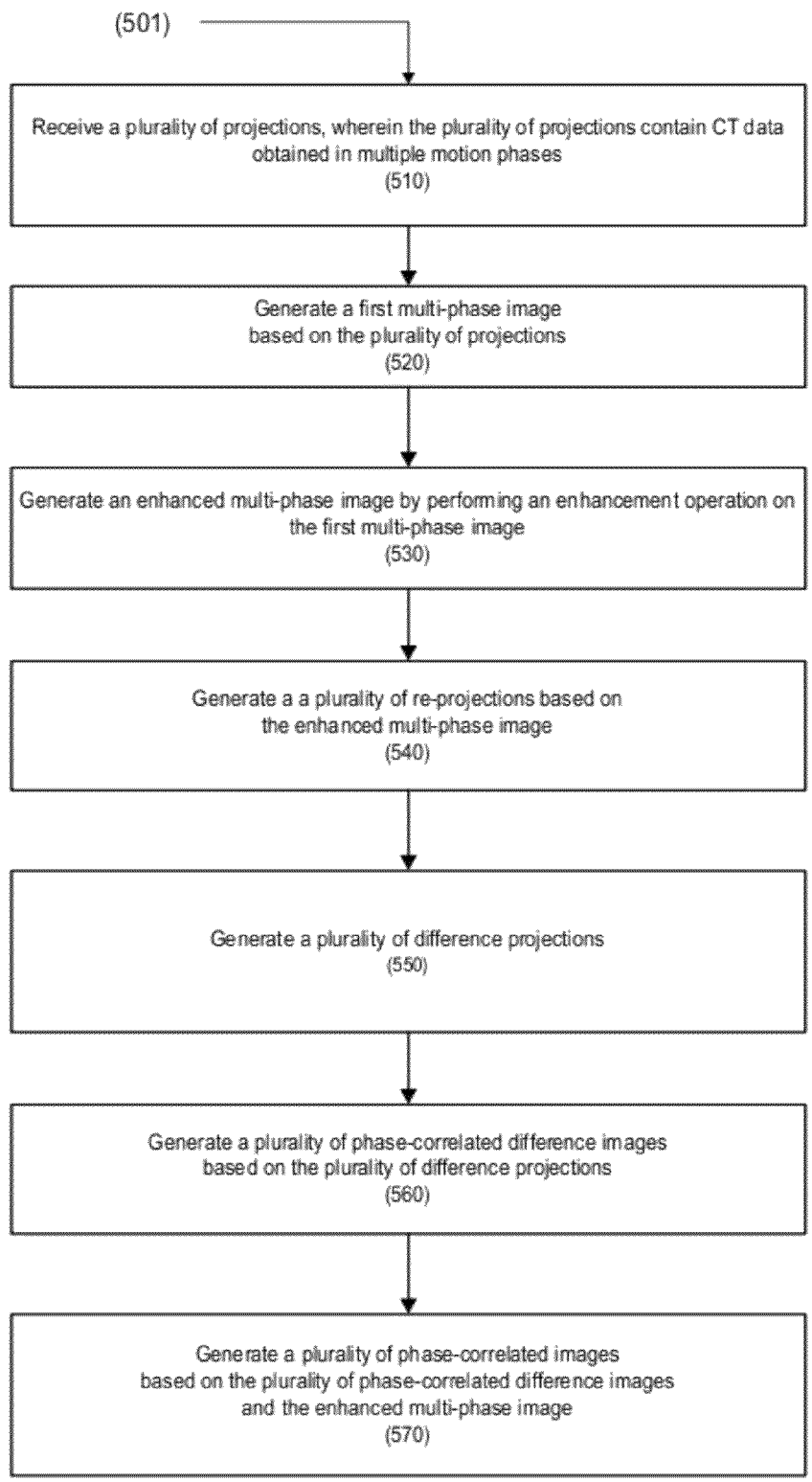
FIG. 5 shows a flow diagram illustrating one embodiment of a process for enhancing a motion-blurred image.

FIG. 5 shows a flow diagram illustrating one embodiment of a process 501 for enhancing a motion-blurred image. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations. In some embodiments, machine-executable instructions for the process 501 may be stored in memory, executed by a processing unit, and/or implemented in an image enhancement server, such as the image enhancing server 130 of FIG. 1.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, a medical imaging device may acquire a plurality of projections from a patient's body. The plurality of projections may contain CT data obtained in multiple motion phases. The following descriptions will use respiratory phases as example motion phases for illustrative purposes.

At block 520, an image enhancement server may receive the plurality of projections and process the plurality of projections to generate a first multi-phase image (also referred to as a prior image). The image enhancement server may back-project each of the plurality of projections to generate a model structure and combine the model structures into the first multi-phase image. The plurality of projections are associated with multiple respiratory phases.

At block 530, the image enhancement server may perform one or more enhancement operations on the first multi-phase image and generate an enhanced multi-phase image. Some example enhancement operations, as discussed in detail above, include, without limitation, a motion extraction approach, a filtering approach, and a segmentation approach.

At block 540, the image enhancement server may forward-project the enhanced multi-phase image and generate a plurality of re-projections. The plurality of re-projections may correspond to the plurality of projections.

At block 550, the plurality of re-projections may be compared with the plurality of original projections for generating a plurality of difference projections. Specifically, each projection selected from the plurality of original projections may be compared with a corresponding re-projection selected from the plurality of re-projections.

At block 560, the plurality of difference projections may be sorted by respiratory phase. The image enhancement server may back-project the difference projections belonging to a specific respiratory phase to generate a difference image. Thus, the plurality of difference projections may be used to generate a plurality of phase-correlated difference images.

At block 570, the plurality of difference images may be used with the enhanced multi-phase image to create a plurality of phase-correlated images, which have motion-induced streaks reduced or removed.

In some embodiments, block 540, block 550, block 560 and block 570 may be combined into a single block, illustrating that the plurality of phase-correlated images may be generated based on the plurality of projections received at block 510, and the enhanced multi-phase image generated at block 530.

Figure 6:
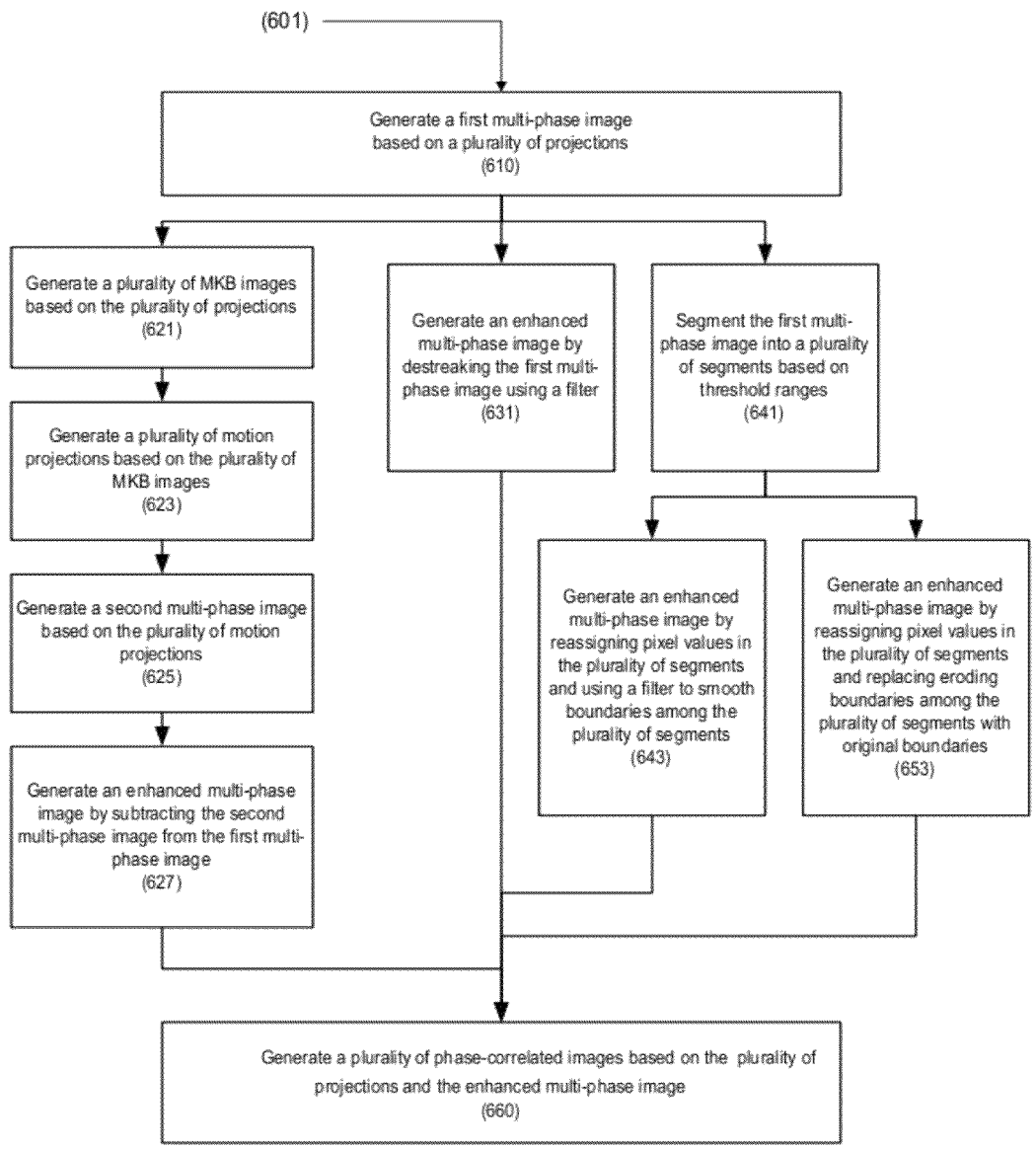
FIG. 6 shows a flow diagram illustrating one embodiment of a process for generating an enhanced multi-phase image.

FIG. 6 shows a flow diagram illustrating one embodiment of a process 601 for generating an enhanced multi-phase image. The process 601 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 6 may be practiced in various implementations. In some embodiments, machine-executable instructions for the process 601 may be stored in memory, executed by a processing unit, and/or implemented by an image enhancement server, such as the image enhancing server 130 of FIG. 1.

At block 610, an image enhancement server may receive a plurality of projections and reconstruct a first multi-phase image (also referred to as a prior image) based on the plurality of projections using similar operations performed at block 520 of FIG. 5. In one embodiment, blocks 621, 623, 625, and 627 illustrate a motion extraction approach to enhance the first multi-phase image. In another embodiment, block 631 illustrates a filtering approach to enhance the first multi-phase image. In yet another embodiment, blocks 641, 643, and 653 illustrate a segmentation approach to enhance the first multi-phase image.

In one embodiment, the image enhancement server may include a selection engine, which may be configured to select one of the aforementioned three approaches based on the available computing resources of the image enhancement server. For example, the motion extraction approach and the segmentation approach may require more computing resources than the filtering approach. Alternatively, the selection engine may be configured to select all three different approaches but apply them at different times to generate an enhanced multi-phase image. For example, the motion extraction approach may be selected first, and the resulting enhanced multi-phase image may go through the filtering approach. The filtered enhanced multi-phase image may still go through the segmentation approach to further improve certain regions of the image. Furthermore, the selection engine may be configured to receive input data, such as preferences or threshold adjustments, relating to the selection and/or combination of the three approaches.

At block 621, the image enhancement server may perform a pass of a MKB reconstruction operation to generate a plurality of MKB phase-correlated images based on the plurality of projections.

At block 623, the image enhancement server may generate a motion map based on the plurality of MKB phase-correlated images. For each phase, the image enhancement server may select a corresponding MKB image from the plurality of MKB phase-correlated images, multiply the motion map with the selected MKB image, and forward-project the results to create a motion projection. After all the motion phases are processed, the result is a plurality of motion projections.

At block 625, the image enhancement server may combine and perform reconstruction based on the plurality of motion projections for all the phases to generate a new static image. This new static image may be a multi-phase image, which contains both the moving objects and the motion-induced streaks. To remove the moving objects, the image enhancement server may multiply the static image with the inverse of the motion map to obtain a streak-only image. The streak-only image may be deemed a second multi-phase image, which contains only the motion-induced streaks.

At block 627, the image enhancement server may remove the streaks from the first multi-phase image by subtracting the second multi-phase image from the first multi-phase image. The outcome of the subtraction may be deemed an enhanced multi-phase image with motion-induced streaks extracted and removed.

In some embodiments, the image enhancement server may select a linear or nonlinear filter to destreak the first multi-phase image at block 631.

In some embodiments, the image enhancement server may select the segmentation approach to enhance the first multi-phase image. According to an example threshold-based segmentation approach, at block 641, the first multi-phase image may be segmented into a plurality of segments based on threshold ranges. As discussed above, the threshold-based segmentation approach may utilize a specific threshold range for each specific body part or air, and process the pixel values of the first multi-phase image by evaluating the pixel values against the threshold range.

At block 643, the image enhancement server may be configured to perform a boundary smoothing operation by reassigning pixel values for each of the plurality of segments and then using a filter to smooth the boundaries among the plurality of segments using a filter. Additional details about block 643 and the boundary smoothing operation are further illustrated in FIG. 7.

At block 653, the image enhancement server may be configured to perform a boundary erosion approach by reassigning pixel values for each of the plurality of segments and then replacing the eroded boundary regions with the original boundary regions among the plurality of segments. Additional details about block 653 and the boundary erosion operation are further illustrated in FIG. 7

At block 660, the enhanced multi-phase image generated via the blocks 627, 631, 643, or 653 may be used, along with the plurality of projections, to generate a plurality of phase-correlated images, in a process that is similar to the blocks 540, 550, 560, and 570 of FIG. 5.

Figure 7:
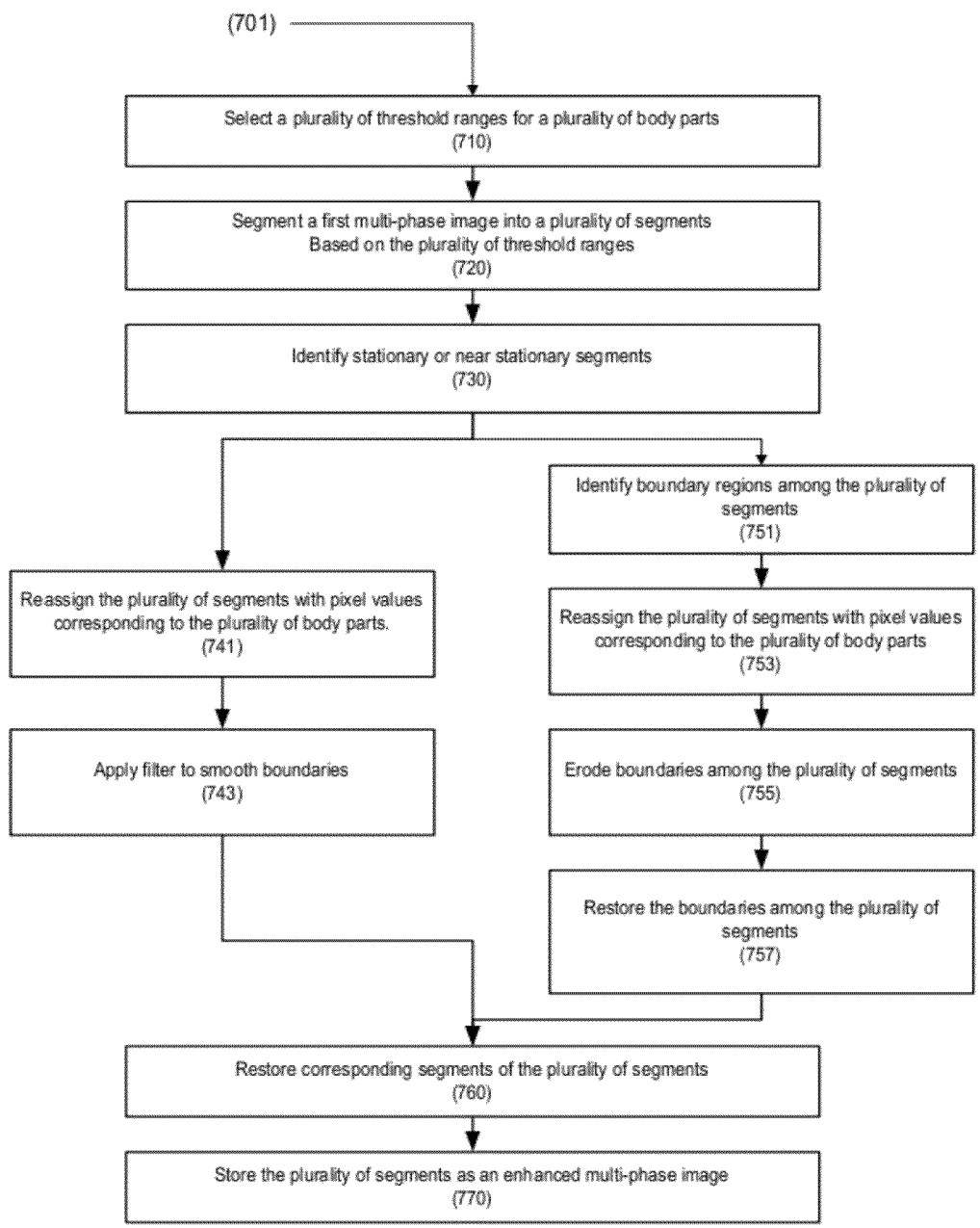
FIG. 7 shows a flow diagram illustrating one embodiments of a process for generating an enhanced multi-phase image using boundary smoothing and/or boundary erosion operations.

FIG. 7 shows a flow diagram illustrating one embodiment of a process 701 for generating an enhanced multi-phase image using boundary smoothing and/or boundary erosion operations. The process 701 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 7 may be practiced in various implementations. In some embodiments, machine-executable instructions for the process 701 may be stored in memory, executed by a processing unit, and/or implemented by an image enhancement server, such as the image enhancement server 130 of FIG. 1.

At block 710, a plurality of threshold ranges may be selected for a plurality of body parts including, without limitation, lungs, soft tissues, bones, cavities, and other organs. For each of the body parts, a specific threshold range based on the HU intensity of the pixel values may be determined. The result is a plurality of threshold ranges that can be used to segment a multi-phase image (also referred to as a prior image).

At block 720, the image enhancement server may segment a first multi-phase image into a plurality of segments. Each pixel in the first multi-phase image may be in one of the plurality of threshold ranges and may be classified as a segment that is associated with one of the plurality of body parts. After all the pixels are processed, the first multi-phase image may contain a plurality of segments with no overlaps.

At block 730, some of the stationary or near stationary segments, such as boney anatomy that is stationary or near stationary during a scan, may be identified from the plurality of segments and may be temporary stored. Such identified segments and their boundary information may be stored in a map to be used at a later time for restoration.

In some embodiments, the image enhancement server may select a boundary smoothing operation (i.e., blocks 741 and 743) to proceed. Alternatively, the image enhancement server may select a boundary erosion approach (i.e., blocks 751, 753, 755, and 757) to proceed.

At block 741, the pixel values for the plurality of segments in the first multi-phase image may be reassigned/replaced with pixels values that are associated with the plurality of body parts. For example, the pixel values for a segment representing a lung may be replaced with mean pixels values that are determined for the lung. On the other hand, the stationary or near stationary segments, such as the boney tissue pixels, may not be replaced with new pixel values.

At block 743, a low pass filter may be selected to smooth the boundaries of the plurality of segments. The filtering operation may be applied on a slice-by-slice basis for a 2D filter and on a volume basis with a 3D filter. An example filter may be a Gaussian filter with a sigma ranging from 1 to 5 pixels.

At block 760, since the above described filtering operation may affect the boundary regions of the stationary or near stationary segments, the stored stationary or near-stationary segments and their boundary information from block 730 may be used to restore these affected regions.

At block 770, the plurality of segments that have their pixel values reassigned, artifacts filtered, and boundary regions restored, may be stored as an enhanced multi-phase image for further processing.

At block 751, the boundary regions among the plurality of segments may be identified and stored.

At block 753, similar to block 741, the plurality of segments may have their pixel values reassigned/replaced with defined values associated with the corresponding plurality of body parts.

At block 755, the boundary regions among the plurality of segments may be eroded. During erosion, the pixel values for these boundary regions may be erased. In other words, as an illustration, the boundaries of a segment may "shrink" 3 pixel-lengths into the segment by having the pixel values within 3 pixel-lengths from the boundaries assigned with a blank value. The erosion process may be applied in a slice-by-slice basis for 2D segments or a volume basis for 3D segments.

At block 757, the saved boundary regions may be used to restore the boundary regions eroded at block 755. In other words, the eroded boundary regions of the plurality of segments may be restored with their corresponding original pixel values that are previously saved, and not replaced by some mean values. For example, the pixel values within 3 pixel-lengths from the boundaries of a segment, which may be eroded at block 755, may be replaced with the corresponding pixel values stored in the saved boundary regions. Additional blending operations may be applied to the segments to ensure smooth transitions among the plurality of segments. For air segments in the plurality of segments, the pixels values may be assigned with a single value for streak removal. No additional operations may be necessary. The plurality of segments may then be used at blocks 760 and 770, as described above.

Thus, methods and systems for enhancing a motion-blurred (or prior) image have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non-recordable media (e.g., read-only memory (ROM), random access memory (RAM), magnetic disk storage media, optical storage media, flash memory devices, etc.)

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method to enhance a motion-blurred image, comprising:
   receiving a plurality of projections, wherein the plurality of projections contain computed tomography (CT) data obtained in multiple motion phases;
   generating a multi-phase image based on the plurality of projections;
   generating an enhanced multi-phase image by performing a destreaking operation on the multi-phase image to reduce one or more motion-induced artifacts in the multi-phase image;
   generating a plurality of re-projections by forward-projecting the enhanced multi-phase image;
   generating a plurality of difference projections by comparing the plurality of projections and the plurality of re-projections;
   generating a plurality of phase-correlated difference images by performing a reconstruction operation based on the plurality of difference projections; and
   generating a plurality of phase-correlated images based on the plurality of phase-correlated difference images and the enhanced multi-phase image.

2. The method as recited in claim 1, wherein the generating of the enhanced multi-phase image comprises:
   generating a plurality of motion projections based on identifying moving pixels that contribute to the one or more motion-induced artifacts in the multi-phase image, being a first multi-phase image;
   generating a second multi-phase image based on the plurality of motion projections; and
   generating the enhanced multi-phase image by combining the second multi-phase image with the first multi-phase image.

3. The method as recited in claim 2, wherein the generating of the plurality of motion projections comprises:
   reconstructing a McKinnon-Bates (MKB) phase-correlated image based on the plurality of projections;
   generating a motion map based on the MKB phase-correlated image; and
   generating one of the plurality of motion projections by performing a forward-projection operation based on the motion map and the MKB phase-correlated image.

4. The method as recited in claim 1, wherein the generating of the enhanced multi-phase image comprises:
   reducing streak intensities in the multi-phase image with a filter.

5. The method as recited in claim 4, wherein the filter is a median filter, a bilateral filter, a neighborhood filter, or a non-local means filter with edge-preserving properties.

6. The method as recited in claim 1, wherein the generating of the enhanced multi-phase image comprises:
   segmenting the multi-phase image into a plurality of segments representing anatomical structures;
   smoothing boundaries among the plurality of segments; and
   generating the enhanced multi-phase image based on the plurality of segments with smoothed boundaries.

7. The method as recited in claim 6, wherein the segmenting of the multi-phase image comprises:
   identifying a plurality of pixels from the multi-phase image based on an intensity threshold range for a body part; and
   reassigning the plurality of pixels with a mean pixel value for the body part, wherein the reassigned plurality of pixels are deemed a segment of the plurality of segments.

8. The method as recited in claim 6, wherein the smoothing of the boundaries comprises applying a filter to the plurality of segments.

9. The method as recited in claim 6, wherein the smoothing of the boundaries is not performed on stationary or near stationary segments.

10. The method as recited in claim 6, wherein the smoothing of the boundaries comprises:
    replacing pixel values for a segment selected from the plurality of segments with a mean value corresponding to a body part associated with the segment;
    eroding boundary regions among the plurality of segments; and
    replacing the eroded boundary regions of the plurality of segments with their corresponding original pixel values.

11. A method to enhance a motion-blurred image, comprising:
    generating a first multi-phase image based on a plurality of projections, wherein the plurality of projections contain computed tomography (CT) data obtained in multiple motion phases;
    generating an enhanced multi-phase image by reducing streaks in the first multi-phase image;
    generating a plurality of re-projections by forward-projecting the enhanced multi-phase image;
    generating a plurality of difference projections by comparing each projection selected from the plurality of projections with a corresponding re-projection selected from the plurality of re-projections;
    generating a plurality of phase-correlated difference images based on the plurality of difference projections; and
    generating a plurality of phase-correlated images based on the plurality of phase-correlated difference images and the enhanced multi-phase image.

12. The method as recited in claim 11, wherein the reducing of the streaks in the first multi-phase image comprising:
    extracting the streaks from the first multi-phase image; and
    removing the streaks from the first multi-phase image.

13. The method as recited in claim 11, wherein the reducing of the streaks in the first multi-phase image comprises applying a filter to the first multi-phase image.

14. The method as recited in claim 11, wherein the reducing of the streaks in the first multi-phase image comprising:
    segmenting the first multi-phase image into a plurality of segments; and
    adjusting boundary regions among the plurality of segments.

15. A non-transitory machine-readable medium containing a set of instructions to enhance a motion-blurred image which, in response to execution by a processor, causes the processor to:
    receive a plurality of projections, wherein the plurality of projections contain computed tomography (CT) data obtained in multiple motion phases;
    generate a multi-phase image based on the plurality of projections;

generate an enhanced multi-phase image by performing a destreaking operation on the multi-phase image to reduce one or more motion-induced artifacts in the multi-phase image;

generate a plurality of re-projections by forward-projecting the enhanced multi-phase image;

generate a plurality of difference projections by comparing the plurality of projections and the plurality of re-projections;

generate a plurality of phase-correlated difference images by performing a reconstruction operation based on the plurality of difference projections; and generate a plurality of phase-correlated images based on the plurality of phase-correlated difference images and the enhanced multi-phase image.

16. The non-transitory machine-readable medium as recited phase image, which in response to execution by the processor, causes the processor to:

generate a plurality of motion projections based on identifying moving pixels that contribute to the one or more motion-induced artifacts in the multi-phase image, being a first multi-phase image;

generate a second multi-phase image based on the plurality of motion projections; and generate the enhanced multi-phase image by combining the second multi-phase image with the first multi-phase image.

17. The non-transitory machine-readable medium as recited in claim 16, containing additional instructions for generating the plurality of motion projections, which in response to execution by the processor, causes the processor to:

reconstruct a McKinnon-Bates (MKB) phase-correlated image based on the plurality of projections;

generate a motion map based on the MKB phase-correlated image; and generate one of the plurality of motion projections by performing a forward-projection operation based on the motion map and the MKB phase-correlated image.

18. The non-transitory machine-readable medium as recited in claim 15, containing additional instructions for generating the enhanced multi-phase image, which in response to execution by the processor, causes the processor to:

reduce streak intensities in the multi-phase image with a filter.

19. The non-transitory machine-readable medium as recited in claim 15, containing additional instructions for generating the enhanced multi-phase image, which in response to execution by the processor, causes the processor to:

segment the multi-phase image into a plurality of segments representing anatomical structures;

smooth boundaries among the plurality of segments; and generate the enhanced multi-phase image based on the plurality of segments with smoothed boundaries.

20. The non-transitory machine-readable medium as recited in claim 19, containing additional instructions for segmenting the multi-phase image, which in response to execution by the processor, causes the processor to:

identify a plurality of pixels from the multi-phase image based on an intensity threshold range for a body part; and reassign the plurality of pixels with a mean pixel value for the body part, wherein the reassigned plurality of pixels are deemed a segment of the plurality of segments.

21. The non-transitory machine-readable medium as recited in claim 19, containing additional instructions for smoothing the boundaries, which in response to execution by the processor, causes the processor to:

replace pixel values for a segment selected from the plurality of segments with a mean value corresponding to a body part associated with the segment;

erode boundary regions among the plurality of segments; and replace the eroded boundary regions of the plurality of segments with their corresponding original pixel values.

22. A non-transitory machine-readable medium containing a set of instructions to enhance a motion-blurred image which, in response to execution by a processor, causes the processor to:

generate a first multi-phase image based on a plurality of projections, wherein the plurality of projections contain computed tomography (CT) data obtained in multiple motion phases;

generate an enhanced multi-phase image by reducing streaks in the first multi-phase image;

generate a plurality of re-projections by forward-projecting the enhanced multi-phase image;

generate a plurality of difference projections by comparing each projection selected from the plurality of projections with a corresponding re-projection selected from the plurality of re-projections;

generate a plurality of phase-correlated difference images based on the plurality of difference projections; and generate a plurality of phase-correlated images based on the plurality of phase-correlated difference images and the enhanced multi-phase image.

* * * * *